US009954371B2

(12) United States Patent
Takehara et al.

(10) Patent No.: US 9,954,371 B2
(45) Date of Patent: Apr. 24, 2018

(54) ENERGY MANAGEMENT DEVICE, ENERGY MANAGEMENT SYSTEM, AND PROGRAM

(71) Applicant: Panasonic Corporation, Kadoma-shi, Osaka (JP)

(72) Inventors: Kiyotaka Takehara, Nara (JP); Akira Baba, Osaka (JP); Shinpei Hibiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 690 days.

(21) Appl. No.: 14/157,562

(22) Filed: Jan. 17, 2014

(65) Prior Publication Data
US 2014/0136010 A1 May 15, 2014

Related U.S. Application Data

(63) Continuation of application No. PCT/JP2012/069694, filed on Aug. 2, 2012.

(30) Foreign Application Priority Data

Aug. 12, 2011 (JP) .................................. 2011-176849

(51) Int. Cl.
*H02J 4/00* (2006.01)
*H02J 3/32* (2006.01)
(Continued)

(52) U.S. Cl.
CPC ................. *H02J 4/00* (2013.01); *H02J 3/14* (2013.01); *H02J 3/32* (2013.01); *H02J 7/0047* (2013.01);
(Continued)

(58) Field of Classification Search
CPC .... H02J 4/00; H02J 3/14; H02J 7/0047; H02J 3/32; H02J 2003/143; Y04S 20/242;
(Continued)

(56) References Cited

U.S. PATENT DOCUMENTS 4,023,043 A * 5/1977 Stevenson ................. H02J 3/14
219/485
6,813,897 B1 * 11/2004 Bash ....................... F25B 27/00
307/64
(Continued)

FOREIGN PATENT DOCUMENTS

CA 2469768 A1 12/2005
JP H11-072252 A 3/1999
(Continued)

OTHER PUBLICATIONS

Extended European search report dated May 11, 2015 in the counterpart European patent application, 8 pages.
(Continued)

*Primary Examiner* — Robert E Fennema
*Assistant Examiner* — Thomas H Stevens
(74) *Attorney, Agent, or Firm* — Metrolexis Law Group, PLLC

(57) ABSTRACT

An electric power acquisition section acquires a power demand of a load. An assist control section determines that an assist condition is satisfied when the power demand exceeds a threshold value within a time slot for permitting electric power to be supplied to the load. When determining that the assist condition is satisfied, the assist control section presents a selection prompt to inquire whether or not to activate an assist operation for supplying the electric power from a power storage device, on an operation display device through a notification control section. If there is a response for requesting activation of the assist operation from the operation display device in response to the selection prompt, the assist operation is started. The assist condition is set in a storage unit by a condition setting section.

19 Claims, 5 Drawing Sheets

(51) Int. Cl.
  *H02J 7/00* (2006.01)
  *H02J 3/14* (2006.01)
  *B23C 3/00* (2006.01)
(52) U.S. Cl.
  CPC ..... *H02J 2003/143* (2013.01); *Y02B 70/3225* (2013.01); *Y02B 70/3266* (2013.01); *Y04S 20/222* (2013.01); *Y04S 20/242* (2013.01)
(58) Field of Classification Search
  CPC .............. Y04S 20/222; Y02B 70/3266; Y02B 70/3225; B23Q 3/15706; G05B 19/40938; Y02P 90/265
  USPC .................................. 700/295; 409/231–233
  See application file for complete search history.

(56) References Cited

U.S. PATENT DOCUMENTS

| | | | | |
|---|---|---|---|---|
| 2001/0025209 | A1* | 9/2001 | Fukui | G06Q 50/06 700/295 |
| 2005/0102068 | A1* | 5/2005 | Pimputkar | H02J 3/14 700/291 |
| 2009/0113323 | A1* | 4/2009 | Zhao | G06Q 10/10 715/764 |
| 2009/0150123 | A1* | 6/2009 | Archibald | G06F 17/5004 703/1 |
| 2009/0326729 | A1 | 12/2009 | Hakim et al. | |
| 2009/0326884 | A1* | 12/2009 | Amemiya | G06F 1/206 703/6 |
| 2010/0076607 | A1* | 3/2010 | Ahmed | G06F 1/206 700/276 |
| 2010/0161148 | A1* | 6/2010 | Forbes, Jr. | G01D 4/004 700/295 |
| 2010/0179704 | A1* | 7/2010 | Ozog | G06Q 10/06315 700/291 |
| 2010/0286840 | A1* | 11/2010 | Powell | G01D 4/002 700/295 |
| 2010/0318233 | A1* | 12/2010 | Yunes | G05B 23/0283 700/287 |
| 2010/0327800 | A1 | 12/2010 | Reineccius | |
| 2011/0184585 | A1 | 7/2011 | Matsuda et al. | |
| 2012/0019210 | A1 | 1/2012 | Wakamatsu et al. | |
| 2012/0065805 | A1* | 3/2012 | Montalvo | G06Q 10/06 700/297 |
| 2012/0146585 | A1* | 6/2012 | Darcy | H02J 3/28 320/128 |
| 2012/0271476 | A1* | 10/2012 | Parsonnet | F24F 5/0017 700/295 |
| 2012/0316695 | A1* | 12/2012 | Chen | H02J 3/008 700/296 |
| 2013/0030595 | A1* | 1/2013 | Chow | H02J 3/14 700/297 |
| 2013/0123998 | A1* | 5/2013 | King | G06F 1/30 700/292 |
| 2013/0304550 | A1* | 11/2013 | Hayashi | H02J 3/008 705/14.1 |

FOREIGN PATENT DOCUMENTS

| | | |
|---|---|---|
| JP | 2000-069673 A | 3/2000 |
| JP | 2001-008385 A | 1/2001 |
| JP | 2006-042422 A | 2/2006 |
| JP | 2006-109621 A | 4/2006 |
| JP | 2007-336796 A | 12/2007 |
| JP | 2008-067439 A | 3/2008 |
| JP | 2009-189125 A | 8/2009 |
| JP | 2010-252516 A | 11/2010 |
| JP | 2011-130649 A | 6/2011 |

OTHER PUBLICATIONS

International Search Report for PCT/JP2012/069694 dated Oct. 9, 2012, 4 pages.

* cited by examiner

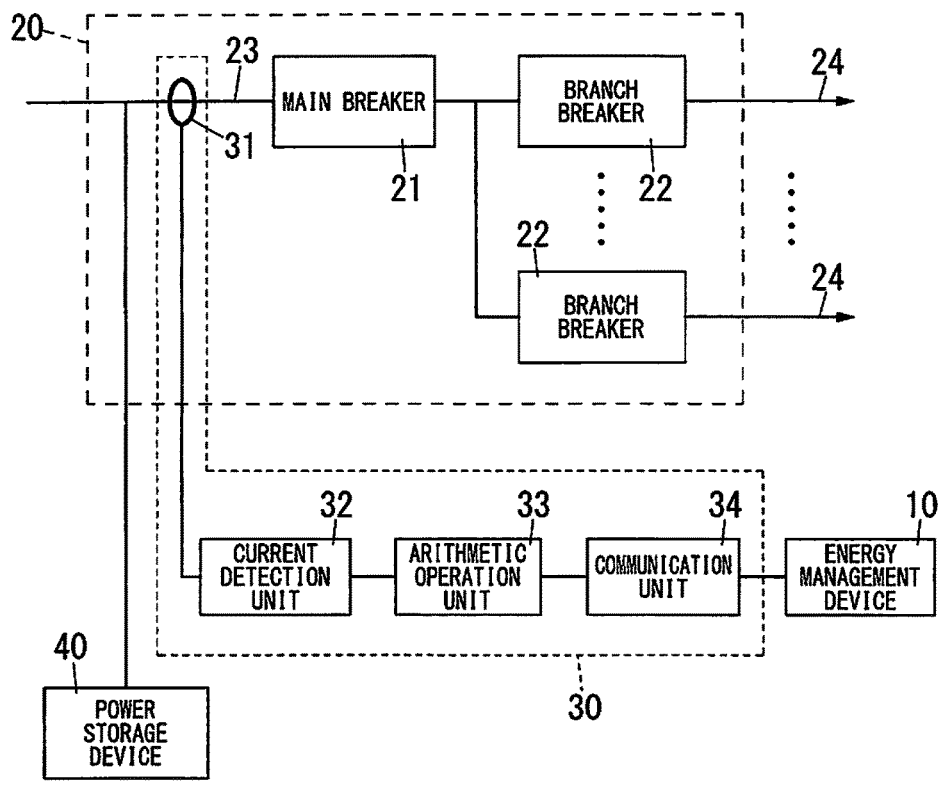
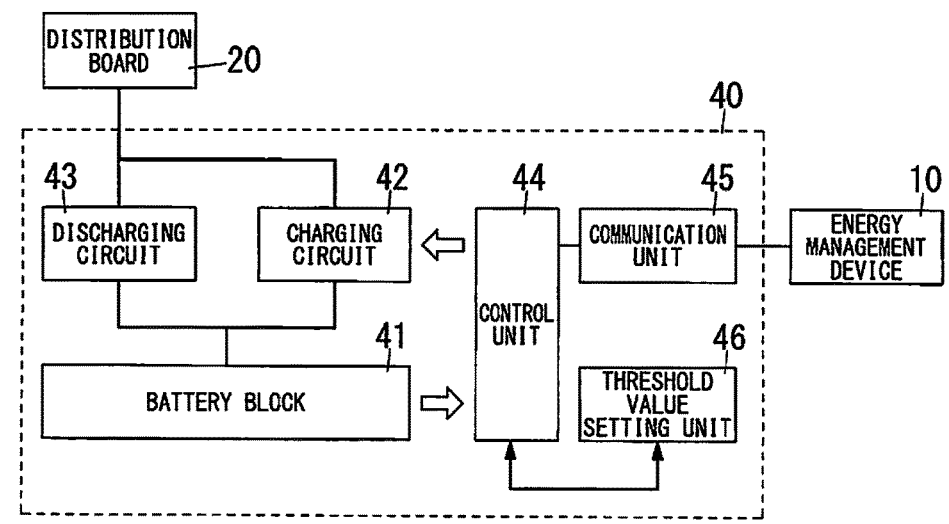

ENERGY MANAGEMENT DEVICE, ENERGY MANAGEMENT SYSTEM, AND PROGRAM

CROSS REFERENCE TO RELATED APPLICATIONS

This application is a continuation application of International Application No. PCT/JP2012/069694, filed on Aug. 2, 2012, entitled "ENERGY MANAGEMENT DEVICE, ENERGY MANAGEMENT SYSTEM, AND PROGRAM", which claims priority based on Article 8 of Patent Cooperation Treaty from prior Japanese Patent Application No. 2011-176849, filed on Aug. 12, 2011, the entire contents of which are incorporated herein by reference.

TECHNICAL FIELD

The present invention relates to: an energy management device for, when demand for electric power at a load increases, suppressing a peak of electric power to be supplied from a power source to the load by supplying electric power from a storage battery to the load; an energy management system including the energy management device; and a program for realizing the energy management device.

BACKGROUND ART

In general, in order to supply a customer with electric power, an electric power supplier sets an electricity rate for each customer based on a contract. For example, there is a contract in which a monthly maximum value of an amount of electric power per unit time (for example, 30 minutes) to be used by the customer is set as a maximum power demand and a unit price of the electricity rate is determined based on the maximum power demand. Further, depending on the electric power supplier, there is a contract in which a contract demand is set for each customer and a circuit breaker (current breaker) is activated when the electric power to be used by the customer exceeds the contract demand.

Meanwhile, social demands for energy saving, suppression of a peak of a power demand, and the like have been increasing in recent years. In particular, it is considered as a promising measure leading to reduction in environmental load to reduce the electric power to be purchased or received from the electric power supplier during a time slot in which demand for electric power increases, because high-output power plants can be reduced in number.

It is proposed to make use of a storage battery in order to prevent the unit price of the electricity rate from increasing or the circuit breaker from being activated in accordance with an increase in the power demand, and to satisfy the above-mentioned social demands. In other words, there is proposed a technology for reducing the received electric power by allowing the customer to use the storage battery and supplying the electric power from the storage battery when the power demand increases. The technology for supplying the electric power from the storage battery when there is an increase in the power demand requested by a load is known as "peak assist".

For example, in Japanese Patent Application Laid-open No. 2006-109621, there is disclosed a technology for adjusting received electric power by controlling charging and discharging of an electric power storage system installed at an electricity customer. In Japanese Patent Application Laid-open No. 2006-109621, the received electric power is adjusted for the purpose of peak-cut for lowering the contract demand or peak-shift for reducing a usage of daytime electric power having a high unit price. Therefore, in the technology disclosed in Japanese Patent Application Laid-open No. 2006-109621, the received electric power is automatically adjusted based on a pattern set for a controller.

Incidentally, in the technology of the peak assist disclosed in Japanese Patent Application Laid-open No. 2006-109621, when the power demand at the load increases, the electric power is always supplied as long as there is room for the electric power (remaining amount) of the storage battery. This is because the customer principally aims at the peak-cut or the peak-shift.

On the other hand, from the viewpoint of achieving the reduction in the environmental load, instead of supplying the electric power from the storage battery whenever the power demand increases, it is desired to suppress the peak itself of the power demand of the customer. In other words, it is effective to reduce a frequency of peak assist by developing the customer's awareness of the suppression of the peak of the power demand. When the peak of the power demand is suppressed, a time period during which the electric power can be supplied from the storage battery is extended, and the life of the storage battery is also extended due to the reduction in the frequency of charging/discharging of the storage battery.

However, the technology disclosed in Japanese Patent Application Laid-open No. 2006-109621 is not configured to allow the customer to recognize whether or not the peak assist has been performed, and therefore has a problem in that the customer is not allowed to recognize when the power demand reaches a peak by using which load. Further, in the configuration disclosed in Japanese Patent Application Laid-open No. 2006-109621, a condition for performing the peak assist is fixed. Accordingly, the condition for performing the peak assist cannot be set so as to become proper for the customer. In other words, there is a problem in that it is not possible to enable the customer to get interested in the peak of the power demand.

SUMMARY OF THE INVENTION

It is an object of an aspect of the present invention to provide an energy management device for enabling a customer to get interested in a power demand through use of stored electric power, an energy management system using the energy management device, and a program for realizing the energy management device.

An energy management device according to a first aspect of the present invention includes: an electric power acquisition section for acquiring a power demand of a load; an assist control section for making, when an assist condition defined for the power demand is satisfied, a selection from activation and deactivation of an assist operation for supplying electric power to the load from a power storage device provided separately from a power source; a notification control section for presenting information indicating that the assist condition is satisfied on a notification device; an input acquisition section for acquiring an input from an operation device; and a condition setting section for setting the assist condition through the input acquisition section.

According to an energy management device of a second aspect of the present invention, in the energy management device of the first aspect, the assist condition includes at least a time slot for permitting the electric power to be supplied from the power storage device to the load and a switching threshold value of the power demand for starting to supply the electric power from the power storage device to the load.

According to an energy management device of a third aspect of the present invention, in the energy management device of the second aspect, the notification control section presents the information indicating that the assist condition is satisfied on the notification device in a format of a selection prompt to inquire about necessity/non-necessity of the activation of the assist operation, the input acquisition section acquires the necessity/non-necessity of the activation of the assist operation from the operation device in response to the selection prompt, and the assist control section activates the assist operation when the input acquisition section acquires a response for requesting the activation of the assist operation from the operation device.

According to an energy management device of a fourth aspect of the present invention, in the energy management device of the second or third aspect, the energy management device further includes a history storage section for storing a history of the satisfied assist condition, and the condition setting section includes a time correction part for automatically adjusting the time slot so that the time slot includes a period in which the electric power is supplied from the power storage device to the load within the history stored in the history storage section.

According to an energy management device of a fifth aspect of the present invention, in the energy management device of the second or third aspects, the energy management device further includes a history storage section for storing a history of the satisfied assist condition, and the condition setting section includes a threshold value adjusting part for automatically adjusting, by using the history stored in the history storage section, the switching threshold value so that a count of how many times the electric power is supplied from the power storage device to the load within a predetermined period becomes closer to a defined count value.

According to an energy management device of a sixth aspect of the present invention, in the energy management device of any one of the first to third aspects, the energy management device further includes: a history storage section for storing a history of the satisfied assist condition; and a remaining amount acquisition section for acquiring a remaining amount of the electric power from the power storage device. The assist condition includes a reference value relating to the remaining amount of the power storage device necessary for the activation of the assist operation, and the condition setting section includes a reference value adjusting part for automatically adjusting, by using the history stored in the history storage section, the reference value so that a minimum value of the remaining amount of the power storage device becomes closer to a defined value during a predetermined period.

According to an energy management device of a seventh aspect of the present invention, in the energy management device of the third aspect, the notification control section presents the selection prompt on the notification device when notified by the assist control section that the assist condition is first satisfied within one day that starts at a defined time.

According to an energy management device of an eighth aspect of the present invention, in the energy management device of the seventh aspect, the notification control section presents, when a response that the assist operation does not need to be activated is obtained from the operation device in response to the selection prompt, the selection prompt on the notification device even when notified by the assist control section that the assist condition is next satisfied within the one day.

According to an energy management device of a ninth aspect of the present invention, in the energy management device of the any one of the third, seventh, and eighth aspects, the assist control section is, when a cumulative value of a count of how many times the response for requesting the activation of the assist operation is obtained from the operation device in response to the selection prompt reaches a defined count, inhibited from issuing the selection prompt to the notification device and presents that the assist operation is being performed on the notification device through the notification control section.

According to an energy management device of a tenth aspect of the present invention, in the energy management device of any one of the first to ninth aspects, the energy management device further includes an interface for communications, and the condition setting section sets the assist condition through the interface.

According to an energy management device of an eleventh aspect of the present invention, in the energy management device of any one of the first to tenth aspects, the electric power acquisition section samples the electric power at predetermined time intervals to use a representative value of the electric power obtained by performing the sampling a plurality of times as the power demand.

An energy management system according to one embodiment of the present invention includes: a power storage device capable of an assist operation for supplying electric power to a load through a feed line for supplying the electric power to the load from an electric power system; a measurement device for measuring a power demand of the load; an energy management device for controlling activation and deactivation of the assist operation based on the power demand measured by the measurement device; a notification device for issuing a notification as instructed from the energy management device; and an operation device forgiving an instruction to the energy management device. The energy management device includes: an electric power acquisition section for acquiring the power demand from the measurement device; an assist control section for making, when an assist condition defined for the power demand is satisfied, a selection from the activation and the deactivation of the assist operation; a notification control section for presenting information indicating that the assist condition is satisfied on the notification device; an input acquisition section for acquiring an input from the operation device; and a condition setting section for setting the assist condition through the input acquisition section.

In other words, the energy management system according to one embodiment of the present invention includes: the energy management device of any one of the first to eleventh exemplary modes described above; the power storage device capable of the assist operation for supplying electric power to the load through the feed line for supplying the electric power to the load from the electric power system; the measurement device for measuring the power demand of the load; the notification device for issuing the notification as instructed from the energy management device; the operation device for giving the instruction to the energy management device. The electric power acquisition section of the energy management device is configured to acquire the power demand from the measurement device, and the energy management device controls the activation and the deactivation of the assist operation based on the power demand measured by the measurement device.

A program according to one embodiment of the present invention causes a computer to operate as an energy management device including: an electric power acquisition section for acquiring a power demand of a load; an assist control section for making, when an assist condition defined for the power demand is satisfied, a selection from activation and deactivation of an assist operation for supplying electric power to the load from a power storage device provided separately from a power source; a notification control section for presenting information indicating that the assist condition is satisfied on a notification device; an input acquisition section for acquiring an input from an operation device; and a condition setting section for setting the assist condition through the input acquisition section.

In other words, the program according to one embodiment of the present invention is a program for causing the computer to operate as the energy management device of any one of the first to eleventh exemplary modes described above.

The program according to one embodiment of the present invention may be stored on a computer-readable storage medium, such as a DVD or other type of non-transitory computer readable medium.

According to the configurations of the present invention, it is possible to enable the customer to get interested in the power demand through the use of the stored electric power, and the customer is allowed to set the assist condition, which is a condition for using the stored electric power at the load. Accordingly, the customer is enabled to be aware of the proper use of the electric power through work for setting the assist condition.

BRIEF DESCRIPTION OF THE DRAWINGS

An exemplary embodiment of the present invention is described in more detail. Other features and advantages of the present invention are more clearly understood from the following detailed description when taken in conjunction with the accompanying drawings in which:

FIG. 3 is a block diagram illustrating an example of a distribution board used in the embodiment of the present invention;

FIG. 4 is a block diagram illustrating a power storage device used in the embodiment of the present invention;

DETAILED DESCRIPTION

Figure 2:
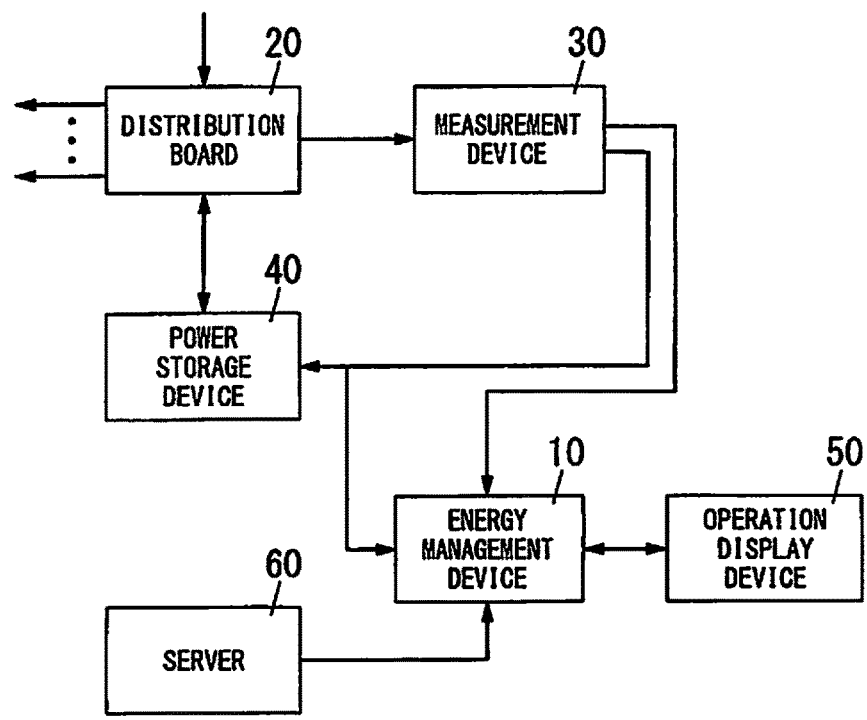
FIG. 2 is a configuration diagram illustrating a connection example of the embodiment of the present invention.

An embodiment of the present invention is described by assuming a distribution network within a house, but the same technology can be employed not only for the house but also for an office or a store. As illustrated in FIG. 2, the distribution network includes a distribution board 20 for receiving electric power from an electric power system of a commercial power source. As illustrated in FIG. 3, the distribution board 20 incorporates a main breaker 21 and a plurality of branch breakers 22, 22, . . . . A main circuit 23 to which the main breaker 21 is connected is branched off to branch circuits 24, 24, . . . of a plurality of systems through the branch breakers 22, 22, . . . , and a load is connected to each branch circuit 24. An outlet is provided between the branch breaker 22 and the load as necessary.

A measurement device 30 is connected to the distribution board 20. The measurement device 30 includes a current sensor 31 for measuring a current supplied to the load (in other words, electric power supplied to the load) through the main circuit 23 on a power source side of the main breaker 21. The measurement device 30 further includes a current detection unit 32 for detecting the current passing through the main circuit 23 from an output from the current sensor 31, an arithmetic operation unit 33 for calculating a power demand (power demand of the load) by using a current value detected by the current detection unit 32, and a communication unit 34 being an interface for communications.

The arithmetic operation unit 33 includes a microcomputer or the like that operates in accordance with a program. The arithmetic operation unit 33 samples the current passing through the main circuit 23 at fixed time intervals (selected from the group consisting of 10 seconds, 1 minute, 30 minutes, and the like), and obtains the electric power by using the sampled current. In this embodiment, it is assumed that the voltage of the main circuit 23 is constant, but the measurement device 30 may measure not only the current but also the voltage. With this configuration, the measurement device 30 measures the power demand due to the loads within the entire house. In the example illustrated in the figures, the measurement device 30 is provided separately from the distribution board 20, but may be incorporated into the distribution board 20.

A power storage device 40 is connected to the main circuit 23 on the power source side (electric power system side) of the current sensor 31. As illustrated in FIG. 4, the power storage device 40 includes a battery block 41 that incorporates a storage battery such as a lithium ion battery, a charging circuit 42 for charging the battery block 41, and a discharging circuit 43 for discharging the battery block 41. The charging circuit 42 includes an AC-DC converter for converting an alternate current of the main circuit 23 into a direct current to charge the battery block 41. The discharging circuit 43 includes a DC-AC converter for converting a direct current of the battery block 41 into an alternate current to supply the alternate current to the main circuit 23. Note that the power storage device 40 is used to prevent a power flow from reversing to a power source system during the discharging.

The power storage device 40 further includes a control unit 44 having a function of monitoring a remaining amount (amount of battery that can be discharged) of the storage battery provided to the battery block 41 and a function of controlling operations of the charging circuit 42 and the discharging circuit 43 and a communication unit 45 being an interface for communications. In addition, the power storage device 40 includes a threshold value setting unit 46 in which a switching threshold value described later is set. A microcomputer that operates in accordance with a program is used as the control unit 44. A memory incorporated into the microcomputer or a memory provided separately from the microcomputer is used as the threshold value setting unit 46.

The control unit 44 provided to the power storage device 40 operates the charging circuit 42 and the discharging circuit 43 in an alternative manner. Specifically, the control unit 44 makes a selection from three states in which the charging circuit 42 is operating, in which the discharging circuit 43 is operating, and in which both the charging circuit 42 and the discharging circuit 43 are deactivated. The control unit 44 makes the selection from the above-mentioned three states by being instructed from outside through the communication unit 45 or by using the switching threshold value set in the threshold value setting unit 46.

According to the above-mentioned configuration, the power storage device 40 receives the electric power from the main circuit 23 to store the electric power in the battery block 41, and discharges the battery block 41 to supply the electric power to the main circuit 23. In other words, by providing the power storage device 40 to perform power storage and discharging at appropriate timings, it is possible to adjust the electric power for each time slot in which the electric power is received from the electric power system (by the distribution board 20).

The power storage device 40 described above is used mainly for leveling the electric power received from the electric power system. For example, the electric power is stored in the power storage device 40 during the time slot in which the power demand is low, and the power storage device 40 is discharged during the time slot in which the power demand is high, to thereby suppress fluctuations in the electric power received from the electric power system to a lower level than fluctuations in the power demand. Specifically, when the state in which the discharging circuit 43 is operating is selected, the electric power is supplied to the load not only from the electric power system of the commercial power source but also from the power storage device 40, which can reduce a ratio of the electric power received from the commercial power source to the power demand.

In a case where a limiting value such as a contract demand is set in advance, the power storage device 40 is discharged before the power demand exceeds the limiting value, to thereby allow peak assist for suppressing a peak of the received electric power. Supplying the electric power from the power storage device 40 to the load (that is, main breaker 21) is hereinafter referred to as "assist operation" of the power storage device 40. The assist operation is performed during a period in which the power demand exceeds the switching threshold value. Accordingly, the power storage device 40 supplies the electric power corresponding to a difference between the power demand and the switching threshold value to the load during the period of the assist operation.

The power storage and discharging of the power storage device 40 are controlled by an energy management device 10. An operation display device 50 having both functions of an operation device and a notification device is connected to the energy management device 10. Further, the energy management device 10 exemplified in the figures includes a communication unit (first communication unit) 17 as an interface for connecting to a server 60 via a communication network built in the house or a communication network such as a wide-area network.

Figure 5:
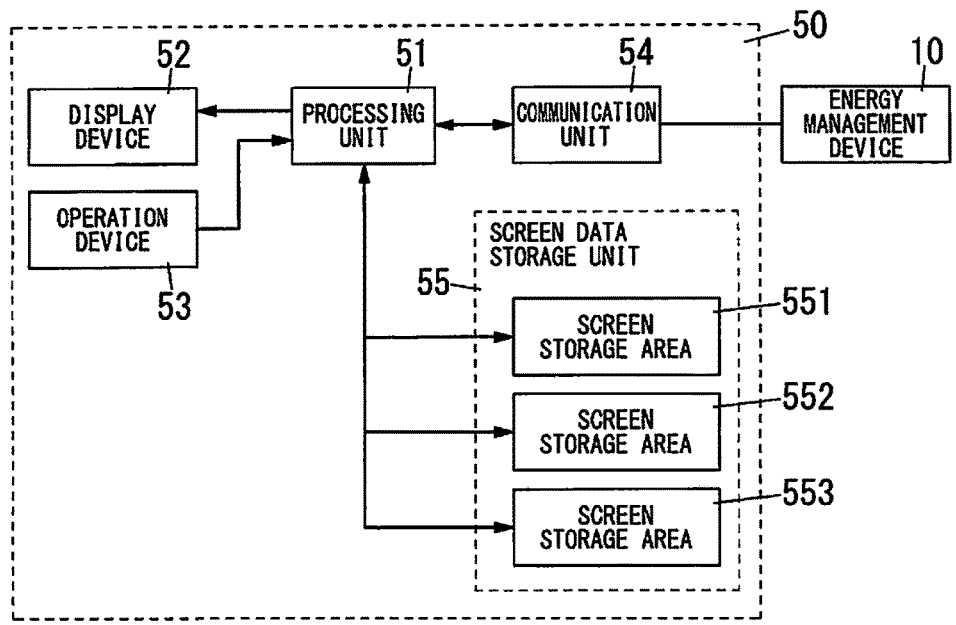
FIG. 5 is a block diagram illustrating an operation display device used in the embodiment of the present invention.

The operation display device 50 according to this embodiment may be implemented as a touch panel. Therefore, as illustrated in FIG. 5, the operation display device 50 includes a processing unit 51 using a microcomputer that operates in accordance with a program, a display device (notification device) 52 formed of a liquid crystal display, and an operation device (input device) 53 arranged by being overlaid on a screen of the display device 52. Further, the operation display device 50 includes a communication unit 54 being an interface for communicating to/from the energy management device 10 and a screen data storage unit 55 for storing screen data displayed on the screen of the display device 52. The screen data storage unit 55 includes screen storage areas 551 to 553 for storing a plurality of types of screen data by type.

The operation display device 50 does not need to be a touch panel, and may be a combination of the display device 52 and switches (for example, keypad) provided with mechanical contacts. Further, the display device 52 and the operation device 53 may be provided separately from each other. In addition, in addition to the display device 52 for visually issuing a notification, the notification device may be configured to audibly issue a notification.

Figure 1:
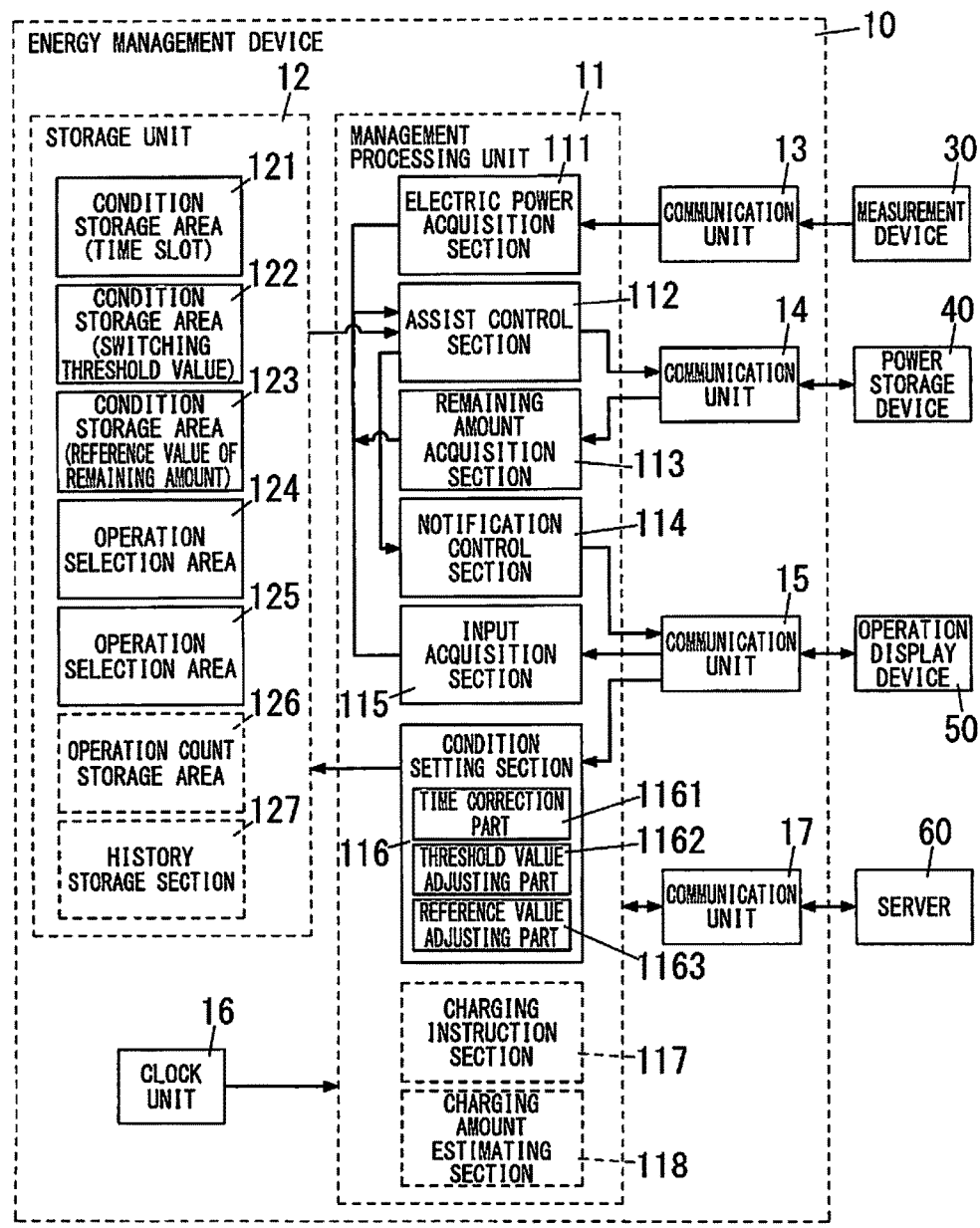
FIG. 1 is a block diagram illustrating an embodiment of the present invention.

As illustrated in FIG. 1, the energy management device 10 further includes a management processing unit 11 including a processor for executing a program as a main component and a storage unit 12 formed of a semiconductor memory for storing data such as an assist condition (described later) used by the management processing unit 11. Further, a communication unit (second communication unit) for communicating to/from the measurement device 30, a communication unit (third communication unit) 14 for communicating to/from the power storage device 40, and a communication unit (fourth communication unit) 15 for communicating to/from the operation display device 50 are mounted to the management processing unit 11. In addition, the energy management device 10 includes a clock unit 16 for keeping a present date/time. A real-time clock may be used as the clock unit 16.

The management processing unit 11 includes an electric power acquisition section 111 for acquiring the power demand of the load from the measurement device 30 through the communication unit 13 and an assist control section 112 for issuing an instruction to operate the charging circuit 42 and the discharging circuit 43 of the power storage device 40 through the communication unit 14. The control unit 44 of the power storage device 40 refers to the instruction received from the assist control section 112 to control the operations of the charging circuit 42 and the discharging circuit 43. Further, the management processing unit 11 includes a remaining amount acquisition section 113 for acquiring the remaining amount of the electric power of the battery block 41 from the power storage device 40 through the communication unit 14. The assist control section 112 has a function of determining whether the assist condition is satisfied or unsatisfied.

The management processing unit 11 further includes a notification control section 114 for presenting information on the operation display device 50 and an input acquisition section 115 for acquiring an input from the operation display device 50. A parameter of the assist condition or the like is input to the input acquisition section 115 in accordance with the input to the operation display device 50. The assist condition is set in the storage unit 12 through a condition setting section 116 included in the management processing unit 11. In addition, the management processing unit 11 includes a charging instruction section 117 for informing the power storage device 40 of a timing of the charging and a charging amount. The charging amount informed of by the charging instruction section 117 is estimated by a charging amount estimating section 118. Operations of the charging instruction section 117 and the charging amount estimating section 118 are described later.

The assist condition is a condition for activating the assist operation, and includes at least the time slot (start time and end time) for permitting the electric power to be supplied from the power storage device 40 to the load and the switching threshold value of the power demand for starting to supply the electric power from the power storage device 40 to the load. Further, the assist condition may include a reference value of the remaining amount of the power storage device 40 (in actuality, remaining amount of the battery block 41). The storage unit 12 includes condition storage areas 121 to 123 for storing a plurality of types of assist condition by type. The condition setting section 116 sets the assist condition for each of the condition storage areas 121 to 123 of the storage unit 12. Further, the storage unit 12 includes operation selection areas 124 and 125 for storing parameters for selecting operations of the energy management device 10.

The assist operation can be activated when all the assist conditions are satisfied. In other words, the assist control section 112 is configured to determine, when all the assist conditions are satisfied, whether or not to execute the assist operation (by referring also to the input from outside). In a case where the time slot and the switching threshold value are set as the assist conditions, the assist operation can be activated when a time at which the power demand exceeds the switching threshold value is included in the time slot of the assist condition. Further, in a case where the time slot, the switching threshold value, and the reference value of the remaining amount are set as the assist conditions, the assist operation can be activated when the time at which the power demand exceeds the switching threshold value is included in the time slot of the assist condition and when the remaining amount of the power storage device 40 is equal to or larger than the reference value. On the other hand, the assist operation is deactivated when the power demand falls below the switching threshold value after the assist operation is activated.

The assist control section 112 has a function of instructing the power storage device 40 to activate and deactivate the assist operation through the communication unit 14. Further, the assist control section 112 has a function of presenting, when the assist condition for activating the assist operation is satisfied, the fact that the assist condition is satisfied on the operation display device 50 through the notification control section 114. In other words, the assist control section 112 according to this embodiment has a function of determining whether the assist condition is satisfied or unsatisfied. The assist control section 112 determines whether the assist condition is satisfied or unsatisfied by using the power demand acquired by the electric power acquisition section 111, the remaining amount of the battery block 41 acquired by the remaining amount acquisition section 113, the present date/time kept by the clock unit 16, the assist condition set in the storage unit 12, and the like.

The assist control section 112 can make a selection from an operation mode (hereinafter referred to as "semi-automatic mode") in which necessity/non-necessity of the assist operation is selected by an operation through the operation display device 50 and an operation mode (hereinafter referred to as "automatic mode") in which the assist operation is automatically activated when the assist condition is satisfied. Further, the assist control section 112 can select an operation mode (hereinafter referred to as "deactivated mode") in which the assist operation is not performed, but the deactivated mode is an operation in which the power storage device 40 does not function, and hence the deactivated mode is not particularly described in this embodiment.

The operation mode of the assist control section 112 is selected by information stored in the operation selection area 124 of the storage unit 12. When the automatic mode is selected, the assist control section 112 presents a start of the assist operation on the operation display device 50 through the notification control section 114, and instructs the power storage device 40 to discharge. When the semi-automatic mode is selected, the assist control section 112 issues a selection prompt to the operation display device 50 through the notification control section 114, and determines the necessity/non-necessity of the discharging of the power storage device 40 based on a response to the input acquisition section 115 made through the operation display device 50. As used herein, the "selection prompt" means a prompt to inquire of a customer whether or not the assist operation needs to be activated.

In order to use an energy management system having the configuration illustrated in FIG. 2, the assist condition is set for each of the condition storage areas 121 to 123 of the storage unit 12. Further, the parameters for selecting the operations of the energy management device 10 are set in the operation selection areas 124 and 125. Accordingly, the energy management device 10 can select an operation mode for setting the assist condition (hereinafter referred to as "setting mode"). The setting mode is selected at power-on, reception of an instruction from the operation display device 50, or other such occasion.

Figure 6:
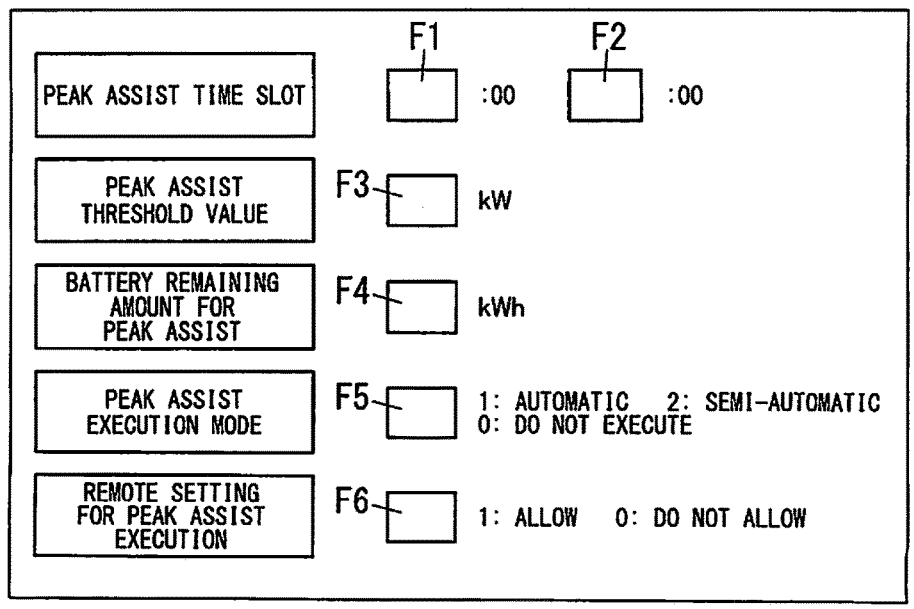
FIG. 6 is a diagram illustrating a display example of the operation display device used in the embodiment of the present invention.

When the setting mode is selected, a screen having such contents as illustrated in FIG. 6 is displayed on the operation display device 50. In the example illustrated in FIG. 6, the time slot (time slot for permitting the electric power to be supplied from the power storage device 40 to the load; in FIG. 6, "PEAK ASSIST TIME SLOT"), the switching threshold value (in FIG. 6, "PEAK ASSIST THRESHOLD VALUE"), and the reference value of the remaining amount of the battery block 41 (in FIG. 6, "BATTERY REMAINING AMOUNT FOR PEAK ASSIST") can be set as the assist conditions. In the screen illustrated in FIG. 6, fields F1 to F4 that allow inputs are provided for the respective assist conditions. Information input in the fields F1 and F2 is stored in the condition storage area (first condition storage area) 121, information input in the field F3 is stored in the condition storage area (second condition storage area) 122, and information input in the field F4 is stored in the condition storage area (third condition storage area) 123.

Further, in the screen illustrated in FIG. 6, selection can be made from the automatic mode, the semi-automatic mode, and the deactivated mode as the operation of the energy management device 10 (in FIG. 6, "PEAK ASSIST EXECUTION MODE"). In FIG. 6, "1: AUTOMATIC", "2: SEMI-AUTOMATIC", and "0: DO NOT EXECUTE" are options for the automatic mode, the semi-automatic mode, and the deactivated mode, respectively, and the screen includes a field F5 for inputting a numeral of the option as a parameter. The parameter input in the field F5 is stored in the operation selection area (first operation selection area) 124. Therefore, the operation mode of the energy management device 10 is selected from the automatic mode, the semi-automatic mode, and the deactivated mode based on the parameter set in the operation selection area 124.

Further, in the screen illustrated in FIG. 6, whether or not the assist condition can be set from a remote location through the server 60 can be selected as the operation of the energy management device 10 (in FIG. 6, "REMOTE SETTING FOR PEAK ASSIST EXECUTION"). In FIG. 6, "1: ALLOW" and "2: DO NOT ALLOW" are options for the allowance and the inhibition, respectively, and the screen includes a field F6 for inputting a numeral of the option as a parameter. The parameter input in the field F6 is stored in the operation selection area (second operation selection area) 125. In other words, in the energy management device 10, whether or not the assist condition can be set from the remote location through the server 60 is selected based on the parameter set in the operation selection area 125.

When the setting mode is selected, the screen illustrated in FIG. 6, which is read from the screen storage area (first screen storage area) 551, is displayed on the operation display device 50. When necessary information is input in each of the fields F1 to F6, the energy management device 10 operates as follows.

Specifically, when "0: DO NOT ALLOW" is selected in the field F6, the energy management device 10 operates based on the parameters input in the fields F1 to F5.

When "1: ALLOW" is selected in the field F6, the energy management device 10 operates based on the parameters input in the fields F1 to F5. When an instruction to change the parameter within any one of the fields F1 to F5 is input from the server 60 (via the communication unit 17), the condition setting section 116 updates the parameter within the designated field. Then, the energy management device 10 operates based on the updated parameters within the fields F1 to F5.

In addition, with "1: AUTOMATIC" selected in the field F5, when the assist conditions set by the parameters input in the fields F1 to F4 are satisfied, the assist control section 112 automatically outputs a start signal for starting the assist operation to the power storage device 40 (via the communication unit 14).

With "2: SEMI-AUTOMATIC" selected in the field F5, when the assist conditions set by the parameters input in the fields F1 to F4 are satisfied, the assist control section 112 outputs a selection prompt signal for presenting the selection prompt to the operation display device 50 (via the notification control unit 114 and the communication unit 15). When a response that the assist operation does not need to be activated is obtained from the operation display device 50 (via the communication unit 15 and the input acquisition section 115), the assist control section 112 inhibits the power storage device 40 from performing the assist operation. On the other hand, when a response for requesting activation of the assist operation is obtained from the operation display device 50, the assist control section 112 outputs the start signal for starting the assist operation to the power storage device 40 (via the communication unit 14).

With "0: DO NOT EXECUTE" selected in the field F5, even when the assist conditions set by the fields F1 to F4 are satisfied, the assist control section 112 inhibits the power storage device 40 from performing the assist operation. Note that, even in this case, the energy management device 10 may use the operation display device 50 to notify that the assist conditions are satisfied.

Note that, in some implementations the energy management device 10 has default values of the assist conditions stored in the storage unit 12. When the default values of the assist conditions are stored in the storage unit 12, if the assist conditions are not set in the condition storage areas 121 to 123 by the condition setting section 116, the assist conditions of the default values are employed. On the other hand, when the assist conditions are set in the condition storage areas 121 to 123 by the condition setting section 116, the assist conditions set by the condition setting section 116 are used with a higher priority than the default values. Note that it is not essential to set the default values of the assist conditions in the storage unit 12.

A description is made of an exemplary use of the above-mentioned configuration. One model of the customer that uses the energy management device 10 is presented below. This model is presented on the assumption that a general customer grows into a customer being aware of a social contribution by using the energy management device 10. This model has a four-stage process formed of an initial introduction stage, a growth stage in which the assist condition changes, a maturation stage in which the assist conditions converge, and a social infrastructure maintenance stage in which the assist conditions are adjusted as requested from outside.

In the introduction stage, the operation mode of the energy management device 10 is set to the semi-automatic mode as default. Further, the assist conditions are set so that the assist operation is easy to be activated. That is, the time slot is set wide, the switching threshold value is set small, and the reference value of the remaining amount is set small. For example, the time slot is set to 7:00 to 22:00, the switching threshold value is set to 3 kW, and the reference value of the remaining amount is set to 1 kWh. Those assist conditions may be set by the customer using the condition setting section 116 in accordance with an instruction manual of the energy management device 10, for example, but may be set as the default values to save the customer time and effort to use the above-mentioned assist conditions.

When activated, the energy management device 10 transmits the switching threshold value being the assist condition to the power storage device 40, and the switching threshold value is set in the threshold value setting unit 46 of the power storage device 40. Further, in some implementations, the reference value of the remaining amount being the assist condition is transmitted to the power storage device 40 to be stored in the power storage device 40. When the remaining amount of the battery block 41 is less than the reference value set in the power storage device 40, the power storage device 40 starts the power storage.

The measurement device 30 samples the current passing through the main circuit 23 at the fixed time intervals by using the current sensor 31 provided to the distribution board 20, and periodically transmits the sampled current value to the energy management device 10 and the power storage device 40.

Figure 7:
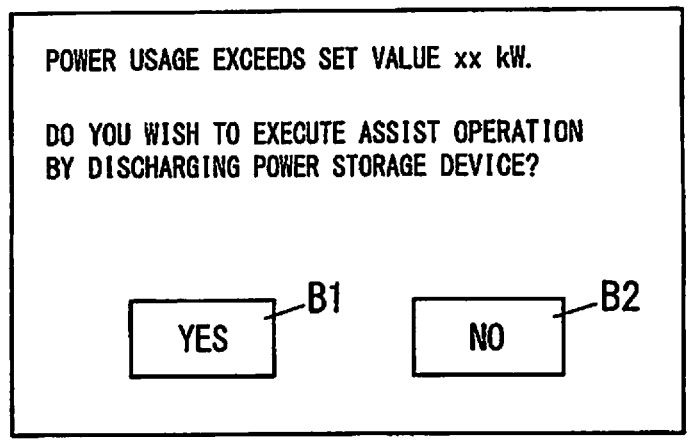
FIG. 7 is a diagram illustrating a display example of the operation display device used in the embodiment of the present invention.

When the current value (amount of electric power per unit time) received from the measurement device 30 is larger than the switching threshold value, and when a time at which the current value is acquired falls within the time slot set as the assist condition, the energy management device 10 displays the screen illustrated in FIG. 7 on the operation display device 50. In other words, when the power demand calculated by the arithmetic operation unit 33 satisfies the assist condition, the notification control section 114 reads the screen stored in the screen storage area (second screen storage area) 552, and presents the necessity/non-necessity of the activation of the assist operation on the operation display device 50 as the selection prompt. This screen is a screen for inquiring whether or not to start the assist operation, and includes buttons B1 and B2 that allow the customer to select the necessity/non-necessity of the assist operation.

In this case, when it is determined whether or not the power demand satisfies the assist condition based on the power demand obtained by one-time sampling, whether the assist condition is satisfied or unsatisfied is frequently changed over, and hence the power storage device 40 needs to quickly switch between the discharging and suspension of the discharging. Further, in order to cause an output from the power storage device 40 to follow an instantaneous change of the power demand, the DC-AC converter (discharging circuit 43) provided to the power storage device 40 needs to be configured to handle rush power generated at the activation of the load or other such occasion, which necessitates the discharging circuit 43 having a large capacity. In other words, a problem arises in that the power storage device 40 being expensive is required.

Therefore, to determine whether or not the power demand satisfies the assist condition, in some implementations a moving average (for example, simple moving average) of the power demand may be utilized. For example, in some implementations the electric power acquisition section 111 obtains a mean value of the power demands, which are obtained by performing the sampling a plurality of times (for example, approximately 5 to 10 times), as a representative value of the power demand to determine whether the assist condition is satisfied or unsatisfied by using the mean value as the power demand. When it is determined whether the assist condition is satisfied or unsatisfied by using the moving average of the power demands sampled at appropriate periods as the representative value of the power demand, there is no influence of a rush current, and hence a large-capacity DC-AC converter is unnecessary, resulting in suppression of a cost increase.

In this case, in addition to the moving average as the representative value of the power demand, the electric power acquisition section 111 may use, as the representative value, a mode value of a plurality of sampled values, the mean value of the plurality of sampled values from which an outlier is excluded, or the like.

On the screen illustrated in FIG. 7, the button B1 ("YES" button) for performing the assist operation is selected, the energy management device 10 instructs the power storage device 90 to activate the assist operation. When instructed, the power storage device 40 operates the discharging circuit 43 to start the discharging, and notifies the energy management device 10 of the remaining amount of the battery block 41 along with the start of the assist operation.

Figure 8:
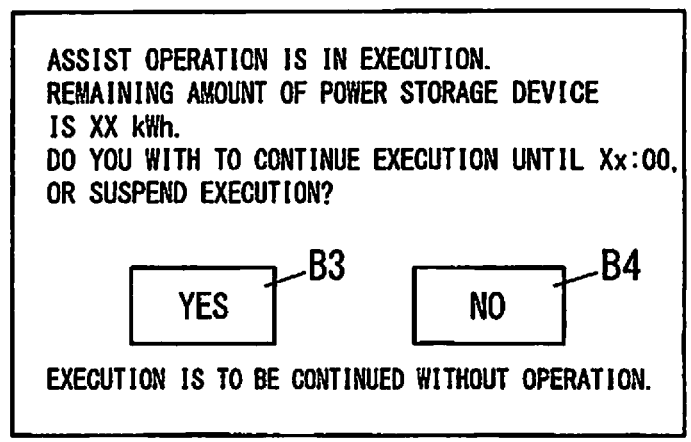
FIG. 8 is a diagram illustrating a display example of the operation display device used in the embodiment of the present invention.

When notified of the start of the assist operation by the power storage device 40, the energy management device 10 displays the screen illustrated in FIG. 8 on the operation display device 50. Specifically, when notified of the start of the assist operation by the power storage device 40, the notification control section 114 reads the screen stored in the screen storage area (third screen storage area) 553, and presents a screen indicating that the assist operation has started on the operation display device 50. On this screen, the fact that the assist operation has started, the remaining amount of the battery block 41, and a time to end the assist operation are displayed. Further, the screen illustrated in FIG. 8 includes buttons B3 and B4 for selecting the necessity/non-necessity of continuation of the assist operation. Unless the button B4 ("NO" button) is selected on this screen, the energy management device 10 continues the assist operation.

On the screens illustrated in FIG. 7 and FIG. 8, when the buttons B2 and B4 ("NO" buttons) for inhibiting the assist operation are selected, the assist operation is not performed or the assist operation is suspended, and hence the electric power received from the electric power system increases unless the power demand is reduced. The assist operation is originally performed in order to level the electric power received from the electric power system, and hence it is not desired that the received electric power increase when the condition for performing the assist operation is satisfied. Therefore, when the customer selects to inhibit the assist operation, the customer is enabled to be aware of the suppression of the power demand by allowing the customer himself/herself to adjust the operation of the load so as to reduce the power demand. In other words, the energy management device 10 according to this embodiment notifies the customer that the assist operation is necessary when the assist operation becomes necessary (when the power demand exceeds the switching threshold value), which enables the customer to be aware of the suppression of the power demand.

When the necessity/non-necessity of the activation of the assist operation is presented on the operation display device 50 as the selection prompt, and when the operation display device 50 is operated in response to the presentation, a result of the operation is acquired by the input acquisition section 115. When the input acquisition section 115 acquires the request for the activation of the assist operation as the result through the operation display device 50, the assist control section 112 activates the assist operation.

After the assist operation is activated in the above-mentioned manner, when the time slot set as the assist condition ends while the assist operation is performed, the energy management device 10 notifies the power storage device 40 that the assist operation has ended. In other words, the discharging circuit 43 of the power storage device 40 is deactivated.

Note that, in this embodiment, when the instruction to start the assist operation is input on the screen illustrated in FIG. 7, the assist operation is automatically repeated every time the power demand exceeds the switching threshold value until the energy management device 10 notifies the power storage device 40 that the assist operation has ended. In other words, once the assist operation is started, the assist operation is automatically repeated until the button B4 is selected on the screen illustrated in FIG. 8 or until the time slot set as the assist condition ends.

Here, the time slot of the assist condition is set within the range of one day, and when the condition for starting the assist operation is satisfied on the following day, the screen illustrated in FIG. 7 is displayed on the operation display device 50 again. In the above-mentioned operation, when the condition for starting the assist operation is satisfied, the screen illustrated in FIG. 7 is displayed, to thereby allow the customer to select the necessity/non-necessity of the assist operation, but it suffices to only notify that the start condition of the assist operation is satisfied. In this case, the customer cannot select the necessity/non-necessity of the assist operation, and the assist operation is automatically repeated unless the operation of the load is adjusted so as to reduce the power demand.

The introduction stage is shifted to the growth stage by the customer himself/herself. In the introduction stage, the energy management device 10 notifies that the start condition of the assist operation is satisfied through the operation display device 50, and hence the customer recognizes an operating state of the load when the assist condition is satisfied.

The assist condition is set so that the assist operation is easy to be activated in the introduction stage, while in the growth stage, the assist condition is changed based on the customer's experience so that the assist operation is harder to be activated than in the introduction stage. In other words, the assist condition is changed by the customer operating the condition setting section 116. In the growth stage, the energy management device 10 continues the semi-automatic mode in order to determine whether or not the set assist condition is suitable.

It is conceivable that the assist conditions converge to a range suitable for the customer after the customer repeatedly sets the assist conditions in the growth stage as described above. When the assist conditions converge, the customer acquires a habit of activating the assist operation every time the energy management device 10 notifies the customer of the start of the assist operation. Conversely, the same operation is merely repeated every day, and hence the customer gets annoyed to select the necessity/non-necessity of the assist operation. Such a stage is referred to as the maturation stage. When the maturation stage is reached, the customer changes the operation mode of the energy management device 10 from the semi-automatic mode to the automatic mode. In the maturation stage, it is conceivable that the customer has less inhibition in performing the assist operation.

In the automatic mode, when the assist condition set in the storage unit 12 is satisfied, the assist operation is automatically started. In other words, the screen for selecting the necessity/non-necessity of the assist operation illustrated in FIG. 7 is not displayed on the operation display device 50, and the assist operation is automatically performed when the assist condition is satisfied.

The above-mentioned maturation stage is a state in which the customer thinks that the power demand is proper, and a state in which a contribution is not enough in the sense that the electric power supplied to an entire society (entire transmission network) is reduced by reducing the power demand. In the maturation stage, the customer thinks that the assist operation is probably performed, and is therefore unaware of further reduction in the power demand, and it is not possible to prompt the customer to further reduce the power demand. Further, when the electric power supplied from the transmission network becomes insufficient, an electric power supplier may wish to achieve leveling of the electric power supply by prompting the customer to actively perform the assist operation at the peak of the power demand.

Therefore, the social infrastructure maintenance stage after the assist operations converge is set as the fourth stage. In the social infrastructure maintenance stage, the option for permitting the assist condition to be set through the server 60 is input in the field F6 on the screen illustrated in FIG. 6, to thereby allow the third party other than the customer to set the assist condition from the remote location. In other words, the assist condition can be set from outside by using an input device mounted to the server 60 or the input device that communicates to/from the server 60.

With such a configuration that allows the assist condition to be set from the remote location, the assist condition can be changed so as to prompt the customer that has reached the maturation stage to further reduce the power demand. Further, when it is predicted that the electric power supply may become insufficient, the electric power supplier asks for the customer's permission to change the assist condition, and changes the assist condition from the remote location so as to match the electric power supply, to thereby prevent a large-scale power outage due to the insufficient electric power supply.

As described above, in the introduction stage, the assist condition is set so that the assist operation is easy to be activated, and the assist operation is operated in the semi-automatic mode. Therefore, the customer recognizes how the use of the electric power is associated with the assist operation, which develops his/her awareness of the use of the electric power. Further, when the customer adjusts the time slot for performing the assist operation depending on a degree of surplus of the amount of electric power supplied by the electric power supplier, the customer can grasp a change in the amount of electric power supplied by the electric power supplier.

In the introduction stage, the customer recognizes a state indicating how the customer is using the load and the degree of surplus of the amount of electric power supplied by the electric power supplier, and hence the suitable assist condition is set in the growth stage based on the experience in the introduction stage. In the growth stage, the semi-automatic mode is continued, and when the assist condition is satisfied, the notification is issued through the operation display device 50.

After the customer acquires the habit of activating the assist operation grows in the semi-automatic mode to reach the maturation stage, the assist operation is activated in the automatic mode. In addition, when the customer that has reached the maturation stage grants permission, the maturation stage shifts to the social infrastructure maintenance stage to allow the assist condition to be changed from the remote location through the server 60. The customer has experienced, in the past, a situation in which the assist operation is activated, and therefore, even if the assist condition is changed from the remote location as requested by the electric power supplier, the customer easily accepts the change of the assist condition. As a result, the customer makes a positive social contribution to the electric power situation.

Incidentally, the assist condition used for the assist operation is set on a daily basis in principle. One day does not need to start at 0:00 a.m., and can be started at a time that is appropriately defined. In this case, the range of one day corresponds to 24 hours from the defined time. The time to start the one day is set, for example, within the time slot from a bedtime to a wake-up time.

It is assumed that the energy management device 10 is currently operating in the semi-automatic mode (in other words, in the introduction stage or the growth stage) and the instruction to activate the assist operation is issued on a daily basis. In other words, the notification control section 114 presents the selection prompt on the operation display device 50 when the assist condition is first satisfied within a period of one day. The assist condition may be satisfied a plurality of times in one day, but the selection prompt is issued when the assist condition is first satisfied after the one day starts. The selection prompt means to notify the customer of the necessity/non-necessity of the activation of the assist operation in a selectable manner.

After the customer requests for the activation of the assist operation in response to the selection prompt, the notification control section 114 is inhibited from issuing the selection prompt even if the assist condition is satisfied before the one day ends. However, in some implementations the notification control section 114 provides notification of the fact that the assist condition is satisfied every time the assist condition is satisfied. The notification control section 114 may keep notifying that the assist condition is satisfied at all times while the assist condition is satisfied. The result of the customer's selection in response to the selection prompt is effective during the period of one day, and when the activation of the assist operation is requested, the assist operation is activated each time the assist condition is satisfied in the period of one day.

On the other hand, after the notification control section 114 presents the selection prompt on the operation display device 50 when the assist condition is first satisfied after the one day starts, if the response that the assist operation does not need to be activated is obtained, in some implementations the notification control section 114 again presents the selection prompt when the assist condition is next satisfied within the period of one day. In this operation, unless the assist operation is activated within the period of one day, the selection prompt is presented every time the assist condition is satisfied.

Note that, after the selection prompt is presented on the operation display device 50 when the assist condition is first satisfied after the one day starts, if the customer selects the non-necessity of the activation of the assist operation, the selection prompt may not be issued from then on within the period of one day. Specifically, the selection prompt is issued only at a time when the assist condition is first satisfied after the one day starts, and the selection prompt is not issued from then on within the period of one day irrespective of which of the necessity and the non-necessity of the activation of the assist operation is selected by the customer at that time point. In other words, the necessity/non-necessity of the activation of the assist operation may become selectable only when the assist condition is first satisfied after the one day starts. In this case, if the customer determines the non-necessity of the activation of the assist operation in response to the selection prompt, the assist operation is not performed from then on within the period of one day.

Here, in the state in which the semi-automatic mode is selected (in the introduction stage and the growth stage), it is conceivable that the customer may not operate the operation display device 50 even when the selection prompt is presented on the operation display device 50. In this case, in some implementations the assist operation can be automatically performed when the remaining amount of the battery block 41 within the power storage device 40 satisfies the assist condition. In other words, in some implementations the energy management device 10 preferentially performs the assist operation.

Further, in some implementation the energy management device 10 may be inhibited from issuing the selection prompt if the remaining amount of the battery block 41 does not satisfy the assist condition even when another assist condition is satisfied. In this case, in some implementation the notification that the power demand exceeds the switching threshold value is issued through the operation display device 50 along with the notification that the remaining amount of the battery block 41 is insufficient.

As described above, with the operation for issuing only the notification when the remaining amount of the battery block 41 is insufficient even if the power demand exceeds the switching threshold value, it is possible to prompt the customer that does not respond to the selection prompt to be aware of the assist operation. In other words, if the remaining amount of the battery block 41 is insufficient, the assist operation is not performed when the assist operation is necessary, and hence the load cannot be used due to the insufficient electric power or the power demand exceeds the contract demand to greatly increase electricity rate. This prompts the customer to be aware of the power demand, and as a result, it is expected that the customer's awareness of the proper use of the load is developed by, for example, avoiding unnecessary use of the load or changing the time slot to use the load.

The shift from the growth stage to the maturation stage is performed by the customer operating the operation display device 50 in the above-mentioned example, but may be automatically performed based on an operation count in the growth stage. In the case of this configuration, in order to store the operation count, the energy management device 10 includes an operation count storage area 126 in the storage unit 12. The operation count storage area 126 stores the operation count of how many times the response for requesting the activation of the assist operation is obtained in response to the selection prompt through the operation display device 50.

Here, as described above, the assist control section 112 is provided with the semi-automatic mode in which the necessity/non-necessity of the assist operation is selected based on the input to the input acquisition section 115 (input received from the operation display device 50) and the automatic mode in which the assist operation is automatically activated when the assist condition is satisfied. When a cumulative value of the operation count stored in the operation count storage area 126 reaches a defined count, the assist control section 112 automatically shifts from the semi-automatic mode to the automatic mode.

It suffices that the operation count stored in the operation count storage area 126 is a simple cumulative value of the operation count, but in some implementations an upper limit may be set for the number of days for which the operation count is accumulated. In other words, if the cumulative value of the operation count does not reach the defined count (for example, 10 times) in the upper-limit number of days, in some implementations the cumulative value is used by excluding the first operation from the accumulated operations. The cumulative value of the operation count may be the operation count of continuous operations. In this case, the operation count matches the number of days. In either case, when the cumulative value of the operation count reaches the defined count, the assist control section 112 automatically shifts from the semi-automatic mode to the automatic mode. Note that, it is assumed that the operation for requesting the activation of the assist operation is not performed two times or more often per one day.

The semi-automatic mode is automatically shifted to the automatic mode based on the cumulative value of the operation count, which allows the shift to be performed at a more suitable timing by using an objective evaluation than in a case where the customer manually effects the shift from the growth stage to the maturation stage.

Incidentally, in the above-mentioned operation, the energy management device 10 can select the setting mode, and in the setting mode, the customer uses the operation display device 50 to input the assist condition. In contrast, the assist condition may be automatically set in the condition setting section 116. However, it is not necessary to automatically set all the assist conditions, and it suffices that a part of the assist conditions can be automatically set. It is to be understood that the energy management device 10 may include all (or two) of a time correction part 1161, a threshold value adjusting part 1162, and a reference value adjusting part 1163 that are described below. The energy management device 10 may be further configured to automatically set the assist conditions of all (or two) of the time slot, the switching threshold value, and the reference value of the remaining amount of the storage battery.

A relationship between the assist condition and the power demand in the past is basically used to automatically determine the assist condition. Therefore, in order to store a history of the power demand exceeding the switching threshold value being the assist condition, a history of whether or not the electric power is supplied from the power storage device 40 to the load, and the like, the energy management device 10 includes a history storage section 127 in the storage unit 12. Every time the power demand exceeds the switching threshold value, the history storage section 127 stores presence/absence of the activation of the assist operation, the start time and the end time of the period in which the power demand exceeds the switching threshold value, the amount of electric power supplied by the assist operation, the remaining amount of the power storage device 40, and the like. Further, in some implementations the history storage section 127 daily stores a count of how many times the assist operation is performed in one day in the semi-automatic mode. In short, the history storage section 127 stores a history of the satisfied assist conditions.

The time correction part 1161 included in the condition setting section 116 is used to automatically set the time slot among the assist conditions. The time correction part 1161 uses the history stored in the history storage section 127 to automatically adjust the time slot so that the time slot includes the period in which the power demand exceeds the switching threshold value. In other words, if the period in which the power demand exceeds the switching threshold value exists outside the range of the time slot set in advance, the time slot for activating the assist operation is corrected in the assist condition so that the time slot includes the above-mentioned period.

Incidentally, as illustrated in FIG. 6, in this embodiment, the time slot of the assist condition is set on an hourly basis. Therefore, the history storage section 127 is configured to be able to record, on a daily basis, whether or not the power demand exceeds the switching threshold value every hour. In other words, to automatically adjust the time slot, the time slot in which the power demand exceeds the switching threshold value is extracted from the hourly history stored in the history storage section 127, and the time slot for performing the assist operation in one day is determined so that the time slot includes all the extracted time slots.

Note that, when the time slot in which the power demand exceeds the switching threshold value extends over consecutive days, continuity of the time slot is prioritized. In this case, the time slot is set in the assist condition so as to extend over two consecutive days. Further, the time to start the one day may be changed so that the time slot of the assist condition falls within the range of one day, to thereby set the time slot of the assist condition.

As described above, the time slot for performing the assist operation is automatically corrected by using actual results of the power demand exceeding the switching threshold value. Accordingly, even if the time slot for performing the assist operation is erroneously set by the customer, the time slot of the assist condition is automatically adjusted to become a proper time slot, which eliminates the need for manual adjustment relating to the time slot.

Further, the threshold value adjusting part 1162 included in the condition setting section 116 is used to automatically set the switching threshold value among the assist conditions. The threshold value adjusting part 1162 uses the history stored in the history storage section 127 to estimate the switching threshold value so that the count of how many times the assist operation is performed in one day becomes the defined count value. Specifically, in consideration of the change of the power demand and the amount of electric power that can be stored in the power storage device 40, the threshold value adjusting part 1162 estimates the switching threshold value so that the amount of electric power that can be stored in one day is properly distributed with respect to the power demand. In addition, the threshold value adjusting part 1162 automatically adjusts the switching threshold value by storing the estimated switching threshold value in the condition storage area 122. The count value is not only defined based on the count of how many times the assist operation is performed but may also be defined based on a count of how many times the notification is issued to the customer. In short, the count value may be defined so that the notification is issued with a frequency to such an extent as to prevent the customer from getting annoyed.

The threshold value adjusting part 1162 uses the past power demand stored in the history storage section 127 to set the switching threshold value in the condition storage area 122 so that the count of how many times the assist operation is performed becomes closer to the defined count value, and hence the switching threshold value is suitably set. In other words, the assist operation is often activated when the switching threshold value is small, while the assist operation is hardly activated when the switching threshold value is large, but by setting the switching threshold value so that the count of how many times the assist operation is performed becomes closer to the defined count value, the assist operation is activated with a proper count. For example, if the count of how many times the assist operation is activated is designated by 10 times per one day, the switching threshold value is adjusted so that the assist operation is performed approximately 10 times per one day. For example, the count value is input from the operation display device 50 via the input acquisition section 115 to be stored in the condition storage area 122. The default value of the count value may be stored in the condition storage area 122.

The assist conditions may include, as described above, the reference value of the remaining amount of the power storage device 40. Specifically, even if the time at which the power demand exceeds the switching threshold value is included in the time slot of the assist condition, the assist operation is not activated when the remaining amount of the power storage device 40 is equal to or smaller than the reference value. Therefore, it is necessary to properly set the reference value of the remaining amount.

The reference value of the remaining amount within the power storage device 40 is stored in the condition storage area 123 included in the storage unit 12. As the reference value stored in the condition storage area 123 becomes smaller, a probability that the assist operation is activated becomes higher, while the probability that the assist operation is activated is lowered as the reference value becomes larger. If the probability that the assist operation is activated is lowered, it is possible to increase a ratio of the electric power allocated to use other than the assist operation to the electric power stored in the power storage device 40. Here, the use other than the assist operation includes the use for aiming at the reduction in the electricity rates by discharging the electric power stored during the nighttime providing low electricity rates in the daytime providing high electricity rates.

The reference value of the remaining amount in the condition storage area 123 can be manually changed by the customer using the operation display device 50, but the reference value of the remaining amount may be automatically changed. A transition of the remaining amount of the power storage device 40 stored in the history storage section 127 is used to automatically change the reference value. The history storage section 127 stores the remaining amount of the power storage device 40 every hour, and manages the transition of the remaining amount on a daily basis.

When the reference value of the remaining amount is set relatively large, the probability that the assist operation is activated is lowered, and hence the amount of electric power discharge by the assist operation is relatively small. As a result, a minimum value of the remaining amount of the power storage device 40 is relatively large. Therefore, the minimum value is obtained based on the remaining amount stored in the history storage section 127, and when the minimum value is equal to or larger than a defined value (for example, value obtained by adding a fixed value to the lower limit value described later), the reference value of the remaining amount may be automatically reduced by a fixed amount. The reference value of the remaining amount is adjusted by the reference value adjusting part 1163 included in the condition setting section 116. In short, the reference value adjusting part 1163 automatically adjusts the reference value of the remaining amount so that the remaining amount of the power storage device 40 is equal to or larger than the defined value and becomes closer to the defined value.

For example, it is assumed that the reference value of the remaining amount of the power storage device 40 set in the condition storage area 123 is 3 kWh and the minimum value of the remaining amount stored in the history storage section 127 is 2 kWh. In this case, assuming that the defined value obtained by adding a fixed value to the lower limit value of the remaining amount is 0.5 kWh, the reference value adjusting part 1163 uses the relationship of the remaining amounts to set the reference value of the remaining amount to 1 kWh by reducing the reference value by 2 kWh, and updates a storage content of the condition storage area 123 to 1 kWh. Such processing allows the reference value of the remaining amount of the power storage device 40 to be automatically adjusted.

Incidentally, in order to properly perform the assist operation, the lower limit value is defined for the remaining amount of the power storage device 40 (in actuality, remaining amount of the battery block 41). In other words, the remaining amount of the power storage device 40 needs to be maintained at equal to or larger than the lower limit value. In order to maintain the remaining amount of the power storage device 40 at equal to or larger than the lower limit value, it is necessary to monitor the remaining amount of the power storage device 40 and properly inform of the charging amount of the power storage device 40.

For that reason, the management processing unit 11 includes the charging amount estimating section 118 for predicting the amount of electric power necessary for the assist operation on the following day by using the history stored in the history storage section 127. The charging amount estimating section 118 estimates the charging amount of the power storage device 40 necessary for the assist operation on the following day by using the predicted amount of electric power and the remaining amount of the power storage device 40 acquired by the remaining amount acquisition section 113. At this time, the charging amount estimating section 118 obtains the charging amount so that the remaining amount of the power storage device 40 becomes equal to or larger than the lower limit value after the assist operation on the following day (for example, so that the remaining amount becomes equal to or larger than the lower limit value at the end time of the time slot for permitting the electric power to be supplied from the power storage device 40 to the load).

The charging instruction section 117 is notified of the charging amount estimated by the charging amount estimating section 118, and the charging instruction section 117 informs the power storage device 40 of the timing of the charging and the charging amount. That is, the power storage device 40 stores the electric power with the charging amount informed of by the charging instruction section 117 so that the remaining amount becomes equal to or larger than the lower limit value even after the assist operation.

A program that realizes an energy management device, energy management system as described above may be stored on a non-transitory computer readable medium. The program stored in the recording medium is read into a system, such as computer, so that the above-described energy management device, energy management system and program can be realized by executing the program while controlling the system. The medium includes such devices as a memory device, magnetic disk device, and an optical disk device, that are able to record the program. For example, the recording medium could be Blu-Ray disk CD-ROM (Compact Disc, read only memory), DVD (Digital Versatile Disc), ZIP disc, JAZ disc, MO (Magneto-optical) disc, DAT (Digital Audio Tape), or the like. A program that realizes an energy management device, energy management system as described above may be stored on a non-transitory computer readable medium. The program stored in the recording medium is read into a system, such as computer, so that the above-described energy management device, energy management system and program can be realized by executing the program while controlling the system. The medium includes such devices as a memory device, magnetic disk device, and an optical disk device, that are able to record the program. For example, the recording medium could be Blu-Ray disk CD-ROM (Compact Disc, read only memory), DVD (Digital Versatile Disc), ZIP disc, JAZ disc, MO (Magneto-optical) disc, DAT (Digital Audio Tape), or the like.

Although the present invention has been described with reference to the preferred embodiment, various modifications and variations can be made in the present invention by those skilled in the art without departing from the spirit of the scope of the present invention, that is, without departing from the scope of the claims.

What is claimed is:
1. An energy management device comprising:
an electric power acquisition section for acquiring information on an amount of electric power demand of a load;
an assist controller for making, when an assist condition defined for the amount of the electric power demand is satisfied, a selection from an activation and a deactivation of an assist operation, the assist operation being an operation of supplying electric power to the load from a power storage device provided separately from a power source;
an input acquisition section for acquiring an input of an assist parameter from an operation device;
a condition setting section that sets the assist condition based on the input of the assist parameter acquired through the input acquisition section; and
a history storage section that stores a history of satisfaction of the assist condition,
wherein:
the assist condition comprises at least a time slot for permitting the electric power to be supplied from the power storage device to the load and a threshold value of the amount of the electric power demand for starting to supply the electric power from the power storage device to the load; and
the assist controller is configured to make the selection of the activation of the assist operation at least when a condition is satisfied: a time at which the amount of the electric power demand exceeds the threshold value is included in the time slot of the assist condition,
wherein the condition setting section comprises a time correction part for automatically adjusting the time slot so that the time slot includes a period in which the amount of the electric power demand exceeds the threshold value within the history stored in the history storage section.

2. An energy management device according to claim 1, further comprising an interface for communications,
wherein the condition setting section sets the assist condition through the interface.

3. An energy management device according to claim 1, wherein the electric power acquisition section samples the electric power at predetermined time intervals to use a representative value of the electric power obtained by performing the sampling a plurality of times as the amount of the electric power demand.

4. An energy management system, comprising:
the energy management device according to claim 1; wherein
the power storage device is capable of performing the assist operation.

5. A non-transitory computer-readable storage medium that stores a program for causing a computer to operate as the energy management device according to claim 1.

6. The energy management device according to claim 1, wherein the assist controller makes the selection of the deactivation for stopping supply of the electric power from the power storage device to the load in a condition in which the amount of the electric power demand falls below the threshold value.

7. An energy management device comprising:
an electric power acquisition section for acquiring information on an amount of electric power demand of a load;
an assist controller for making, when an assist condition defined for the amount of the electric power demand is satisfied, a selection from an activation and a deactivation of an assist operation, the assist operation being an operation of supplying electric power to the load from a power storage device provided separately from a power source;
an input acquisition section for acquiring an input of an assist parameter from an operation device;
a condition setting section that sets the assist condition based on the input of the assist parameter acquired through the input acquisition section; and
a history storage section that stores a history of satisfaction of the assist condition,
wherein:
the assist condition comprises at least a time slot for permitting the electric power to be supplied from the power storage device to the load and a threshold value of the amount of the electric power demand for starting to supply the electric power from the power storage device to the load; and
the assist controller is configured to make the selection of the activation of the assist operation at least when a condition is satisfied: a time at which the amount of the electric power demand exceeds the threshold value is included in the time slot of the assist condition,
wherein the condition setting section comprises a threshold value adjusting part for automatically adjusting, by using the history stored in the history storage section, the threshold value so that a count of how many times the electric power is supplied from the power storage device to the load within a predetermined period becomes closer to a defined count value.

8. An energy management system, comprising:
the energy management device according to claim 7; wherein
the power storage device is capable of performing the assist operation.

9. A non-transitory computer-readable storage medium that stores a program for causing a computer to operate as the energy management device according to claim 7.

10. An energy management device comprising:
an electric power acquisition section for acquiring information on an amount of electric power demand of a load;
an assist controller for making, when an assist condition defined for the amount of the electric power demand is satisfied, a selection from an activation and a deactivation of an assist operation, the assist operation being an operation of supplying electric power to the load from a power storage device provided separately from a power source;
an input acquisition section for acquiring an input of an assist parameter from an operation device;
a condition setting section that sets the assist condition based on the input of the assist parameter acquired through the input acquisition section;
a history storage section that stores a history of satisfaction of the assist condition; and
a remaining amount acquisition section for acquiring information on a remaining amount of an electric power stored in the power storage device, from the power storage device, wherein:
the assist condition comprises at least a time slot for permitting the electric power to be supplied from the power storage device to the load and a threshold value of the amount of the electric power demand for starting to supply the electric power from the power storage device to the load; and
the assist controller is configured to make the selection of the activation of the assist operation at least when a condition is satisfied: a time at which the amount of the electric power demand exceeds the threshold value is included in the time slot of the assist condition, wherein:
the assist condition further comprises a reference value relating to the remaining amount of the power storage device necessary for the activation of the assist operation; and
the condition setting section comprises a reference value adjusting part for automatically adjusting, by using the history stored in the history storage section, the reference value so that a minimum value of the remaining amount of the power storage device becomes closer to a defined value during a predetermined period.

11. An energy management system, comprising:
the energy management device according to claim 10; wherein
the power storage device is capable of performing the assist operation.

12. A non-transitory computer-readable storage medium that stores a program for causing a computer to operate as the energy management device according to claim 10.

13. An energy management device, comprising:
an electric power acquisition section for acquiring information on an amount of electric power demand of a load;
an assist controller for making, when an assist condition defined for the amount of the electric power demand is satisfied, a selection from an activation and a deactivation of an assist operation, the assist operation being an operation of supplying electric power to the load from a power storage device provided separately from a power source;

an input acquisition section for acquiring an input of an assist parameter from an operation device;

a condition setting section that sets the assist condition based on the input of the assist parameter acquired through the input acquisition section; and a notification controller that presents information indicating that the assist condition is satisfied on a notification device, wherein:

the assist condition comprises at least a time slot for permitting the electric power to be supplied from the power storage device to the load and a threshold value of the amount of the electric power demand for starting to supply the electric power from the power storage device to the load; and the assist controller is configured to make the selection of the activation of the assist operation at least when a condition is satisfied: a time at which the amount of the electric power demand exceeds the threshold value is included in the time slot of the assist condition, wherein:

the notification controller presents the information indicating that the assist condition is satisfied on the notification device in a format of a selection prompt to inquire about necessity/non-necessity of the activation of the assist operation;

the input acquisition section acquires an input of the necessity or non-necessity of the activation of the assist operation from the operation device in response to the selection prompt; and the assist controller activates the assist operation when the input acquisition section acquires a response to the selection prompt comprising an input of the necessity of the activation of the assist operation from the operation device, wherein the notification controller presents the selection prompt on the notification device when notified by the assist controller that the assist condition is first satisfied within a predetermined time duration that starts at a defined time.

14. An energy management device according to claim 13, wherein the notification controller presents, when a response that the assist operation does not need to be activated is obtained from the operation device in response to the selection prompt, the selection prompt on the notification device even when notified by the assist controller that the assist condition is next satisfied within the predetermined time duration.

15. An energy management system, comprising:
the energy management device according to claim 13, wherein
the power storage device is capable of performing the assist operation.

16. A non-transitory computer-readable storage medium that stores a program for causing a computer to operate as the energy management device according to claim 13.

17. An energy management device, comprising:
an electric power acquisition section for acquiring information on an amount of electric power demand of a load;

an assist controller for making, when an assist condition defined for the amount of the electric power demand is satisfied, a selection from an activation and a deactivation of an assist operation, the assist operation being an operation of supplying electric power to the load from a power storage device provided separately from a power source;

an input acquisition section for acquiring an input of an assist parameter from an operation device;

a condition setting section that sets the assist condition based on the input of the assist parameter acquired through the input acquisition section; and a notification controller that presents information indicating that the assist condition is satisfied on a notification device, wherein:

the assist condition comprises at least a time slot for permitting the electric power to be supplied from the power storage device to the load and a threshold value of the amount of the electric power demand for starting to supply the electric power from the power storage device to the load; and the assist controller is configured to make the selection of the activation of the assist operation at least when a condition is satisfied: a time at which the amount of the electric power demand exceeds the threshold value is included in the time slot of the assist condition, wherein:

the notification controller presents the information indicating that the assist condition is satisfied on the notification device in a format of a selection prompt to inquire about necessity/non-necessity of the activation of the assist operation;

the input acquisition section acquires an input of the necessity or non-necessity of the activation of the assist operation from the operation device in response to the selection prompt; and the assist controller activates the assist operation when the input acquisition section acquires a response to the selection prompt comprising an input of the necessity of the activation of the assist operation from the operation device, wherein the assist controller is, when a cumulative value of a count of how many times the response for requesting the activation of the assist operation is obtained from the operation device in response to the selection prompt reaches a defined count, inhibited from issuing the selection prompt to the notification device and presents that the assist operation is being performed on the notification device through the notification controller.

18. An energy management system, comprising:
the energy management device according to claim 17; wherein
the power storage device is capable of performing the assist operation.

19. A non-transitory computer-readable storage medium that stores a program for causing a computer to operate as the energy management device according to claim 17.

* * * * *